United States Patent [19]
Lee

[11] Patent Number: 5,829,342
[45] Date of Patent: Nov. 3, 1998

[54] COOKER ASSEMBLY

[76] Inventor: Martin Lee, No.31, Alley 52, Lane 245 Pate Road, Sec. 4, Taipei, Taiwan

[21] Appl. No.: 60,751

[22] Filed: Apr. 16, 1998

[51] Int. Cl.⁶ .............................. A47J 27/00; A47J 27/08; A47J 36/00; B01F 7/00
[52] U.S. Cl. ..................... 99/348; 16/110 A; 16/114 A; 99/403; 220/735; 220/912; 366/130; 366/197; 366/279
[58] Field of Search ............................ 99/337, 848, 403, 99/646 R; 16/114 R, 114 A, 110 A, 110 R, DIG. 24; 206/542; 220/752, 759, 735, 912; 294/27.1, 33; 366/129, 130, 197, 279; 426/115, 124, 523

[56] References Cited

U.S. PATENT DOCUMENTS

| | | | |
|---|---|---|---|
| 315,989 | 4/1885 | Ziph | 16/114 A |
| 376,001 | 1/1888 | Johnson | 220/735 X |
| 846,010 | 3/1907 | Corbell | 99/403 X |
| 3,810,605 | 5/1974 | Lambert | 99/348 |
| 4,429,624 | 2/1984 | Linn | 99/348 |
| 4,854,717 | 8/1989 | Crane et al. | 366/107 |
| 4,856,910 | 8/1989 | Cuschera | 99/348 X |
| 5,105,963 | 4/1992 | Scott | 220/735 |
| 5,373,608 | 12/1994 | Welch | 16/110 A |
| 5,626,256 | 5/1997 | Onneweer | 220/574 |
| 5,666,874 | 9/1997 | Wang | 99/348 |
| 5,705,212 | 1/1998 | Atkinson | 426/115 |
| 5,715,570 | 2/1998 | Hyun | 16/110 A |

Primary Examiner—Timothy F. Simone
Attorney, Agent, or Firm—Bacon & Thomas

[57] ABSTRACT

A cooker assembly including a cooker body, a handle, an auxiliary handle, and a cover. The cooker assembly is characterized in that the handle is rotatable to be closed near the cooker body and is adapted to allow a spoon or lifter thereon to be placed thereon when the cooker body is not covered by the cover; the auxiliary handle is adapted to receive one end of the spoon or lifter when the cooker body is not covered by the cover; and the cover has a knob adapted to allow the spoon or lifter to be placed thereon and is rotatable to allow control of escape of air from the cooker body. The cooker assembly therefore facilitates preparation of food and is easy to store and transport.

4 Claims, 7 Drawing Sheets

COOKER ASSEMBLY

BACKGROUND OF THE INVENTION (a) Field of the Invention

The present invention relates to a cooker assembly, and more particularly to a cooker assembly that is convenient to use, store, and transport.

(b) Description of the Prior Art

As pans have long handles, they are space occupying and difficult to store and transport. Besides, there is the problem of placing spoons or lifters when cooking food. Furthermore, pot and pan covers are generally not provided with means to control escape of air from pots and pans.

SUMMARY OF THE INVENTION

A primary object of the present invention is to provide a cooker assembly which is convenient to use, store and transport. According to the present invention, the cooker assembly comprises a cooker body, a handle, an auxiliary handle, and a cover. The handle is provided with a longitudinal curved depression for placement of a spoon or lifter during cooking. The handle is further provided with a pushbutton whereby the handle is rotatable relative to the cooker body to facilitate storage and transportation. The auxiliary handle is provided with a through hole adapted to receive one end of a spoon or lifter during cooking. The cover includes a knob provided with a curved recess at an upper side thereof adapted to receive a spoon or lifter. The knob has a base coupled to the cover and provided with a hole corresponding to a hole formed in the cover. Turning of the knob controls the opening or closing of the holes of the base and the cover to allow adjustment of air escaping from the cooker body.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
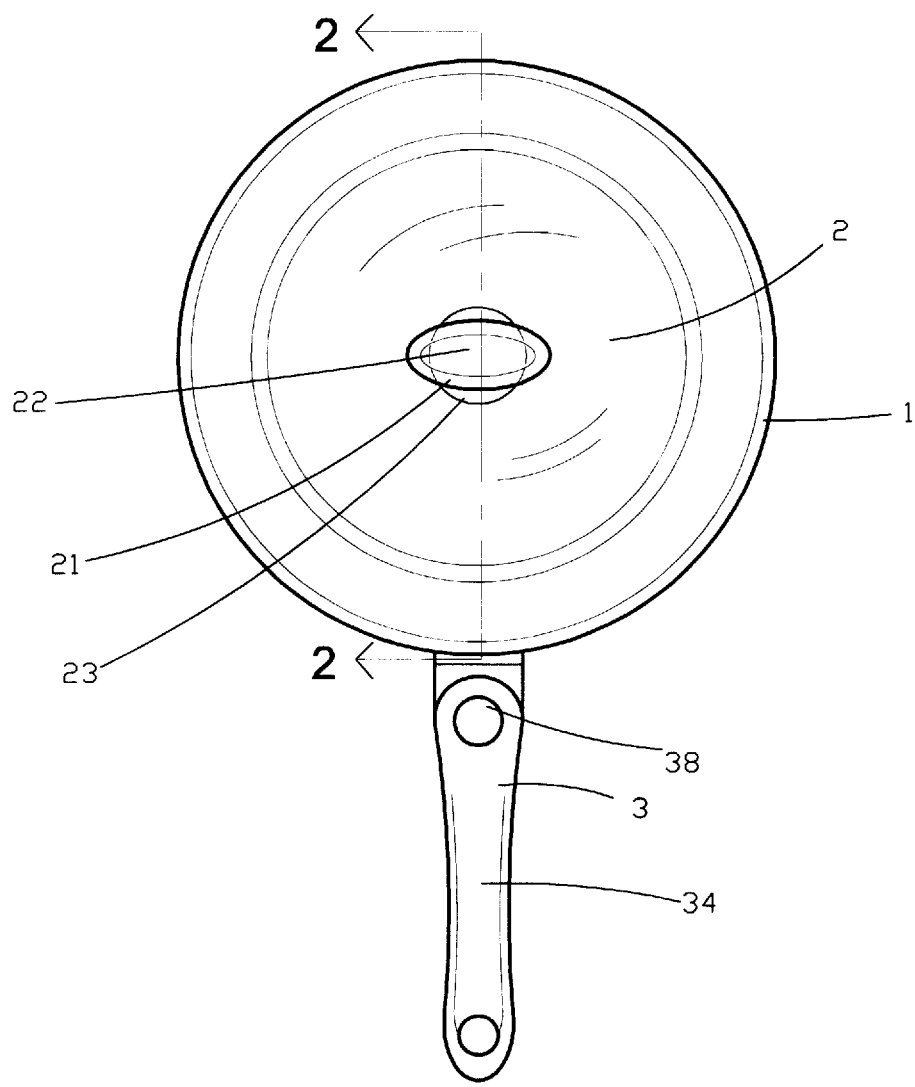
FIG. 1 is a top view of the cooker assembly of the present invention when the cover is put in place.
Figure 2:
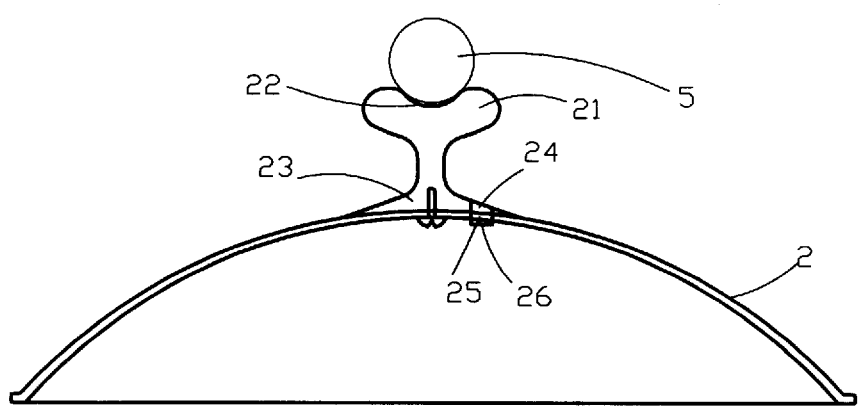
FIG. 2 is a side view of the cover of the cooker assembly of the present invention.
Figure 3:
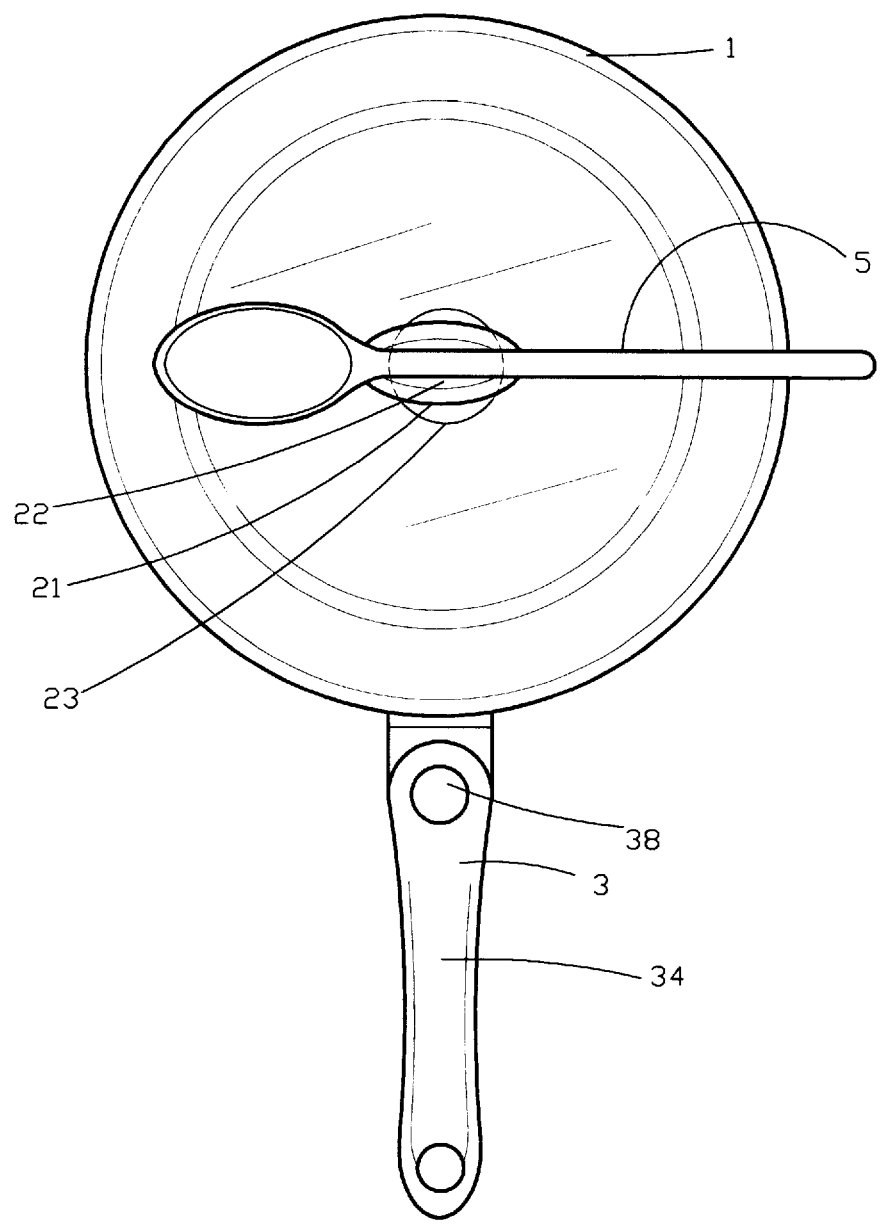
FIG. 3 is a schematic view illustrating the cover having a spoon or lifter placed on an upper side of a knob thereof.

The cooker assembly according to the present invention may be adapted for use in pots and pans. With reference to FIGS. 1 and 2, when the present invention is adapted for use in a saucepan, it essentially comprises a pan body 1, a pan cover 2, and a rotary handle 3. Referring to FIG. 2, the pan cover 2 is provided with a knob 21 which is substantially oval. The knob 21 has a curved recess 22 at an upper side thereof adapted to receive a spoon or a lifter 5 (see FIG. 3). The knob 21 further has a base 23 having a hole 24 corresponding to a hole 25 formed in the pan cover 2. The knob 21 is rotatable to control the opening or closing of the holes 24 and 25 so as to regulate the release of air from the pan. The hole 24 of the base 23 further has a projection 26 at one side to limit the angle of rotation of the knob 21 within a certain range.

Figure 4:
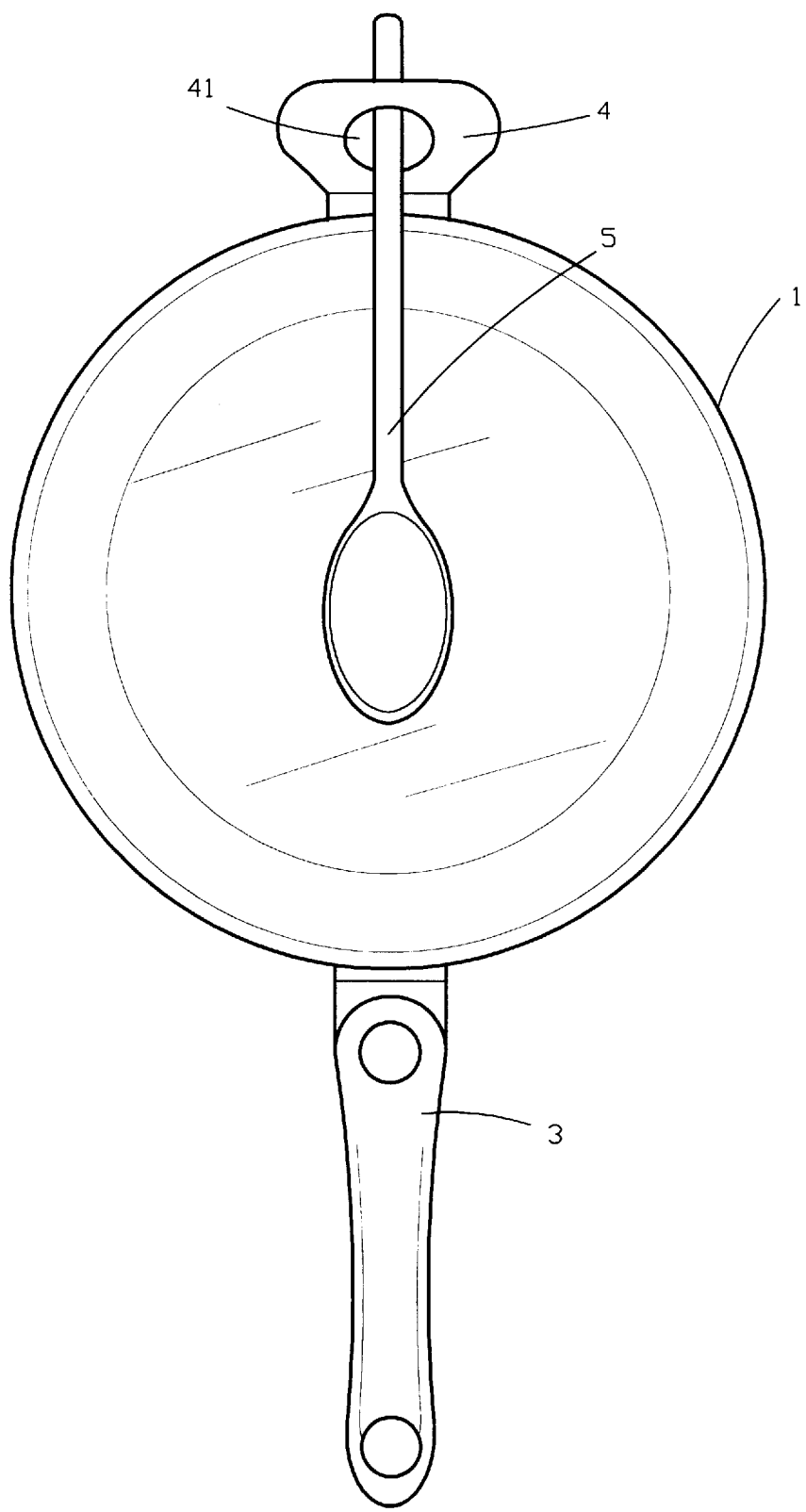
FIG. 4 is a schematic view illustrating the cooker assembly of the present invention provided with an auxiliary handle having a through hole for holding a spoon or lifter.

Referring to FIG. 4, when the present invention is adapted for use in a larger pan (which is generally provided with an additional auxiliary handle 4 opposite to the handle 3), the present invention includes an auxiliary handle 4 provided with a through hole 41 such that the spoon or lifter 5 may be insertably held in the through hole 41 when the pan body 1 is not covered.

Figure 5:
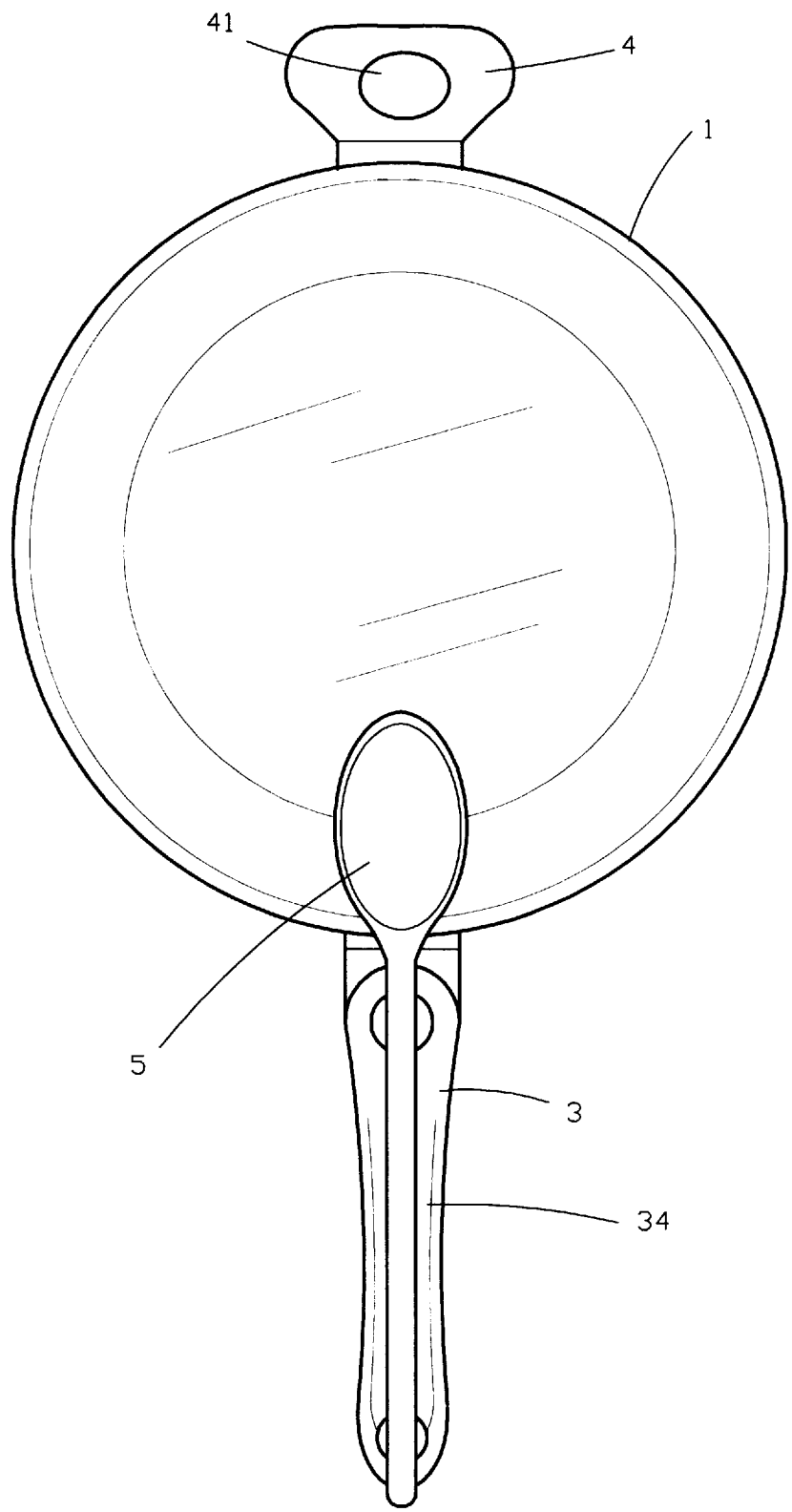
FIG. 5 is a schematic view illustrating a spoon or lifter placed on a handle of the cooker assembly of the present invention.
Figure 6:
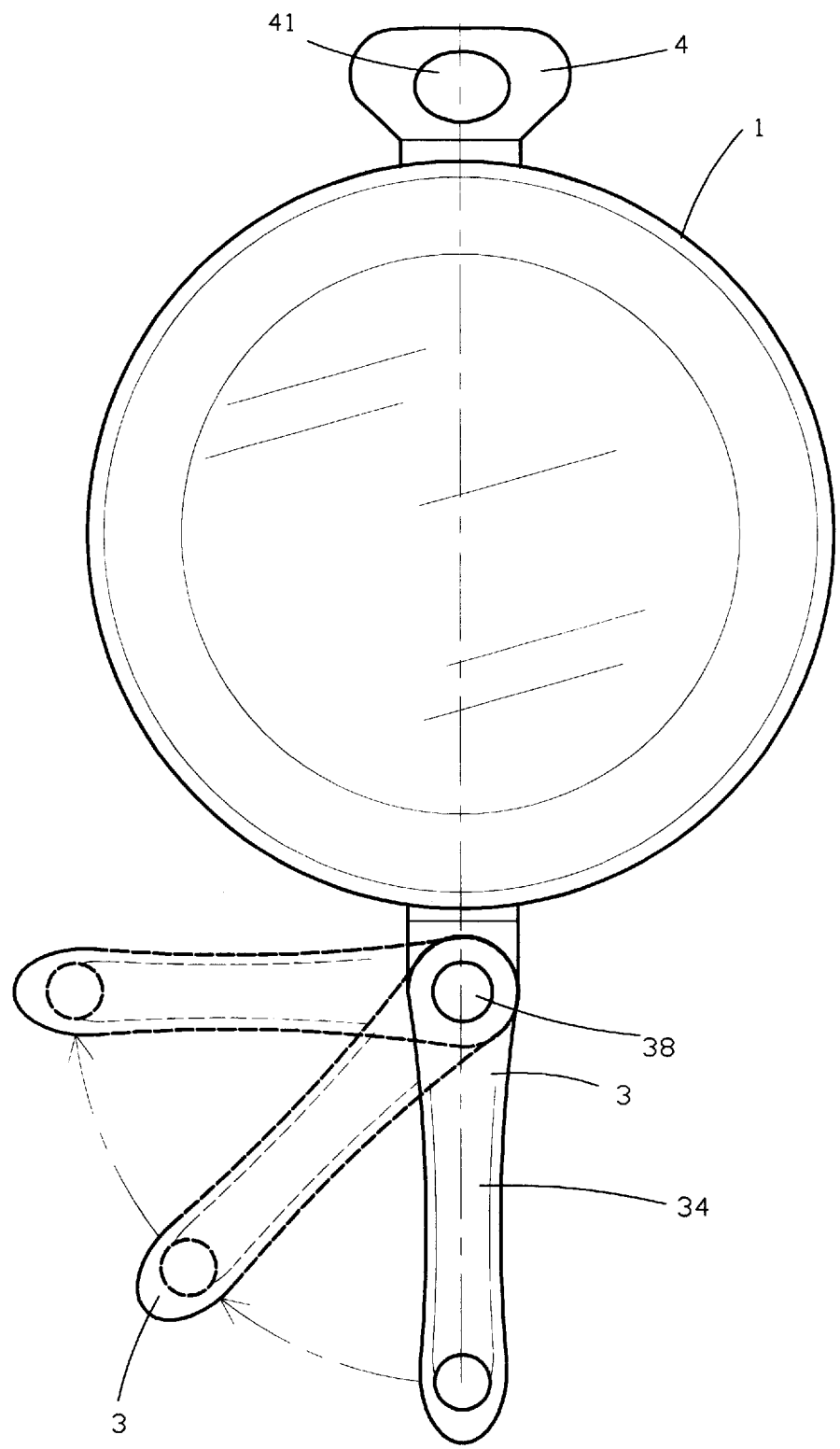
FIG. 6 is a schematic view illustrating turning of the handle of the cooker assembly of the present invention.
Figure 7:
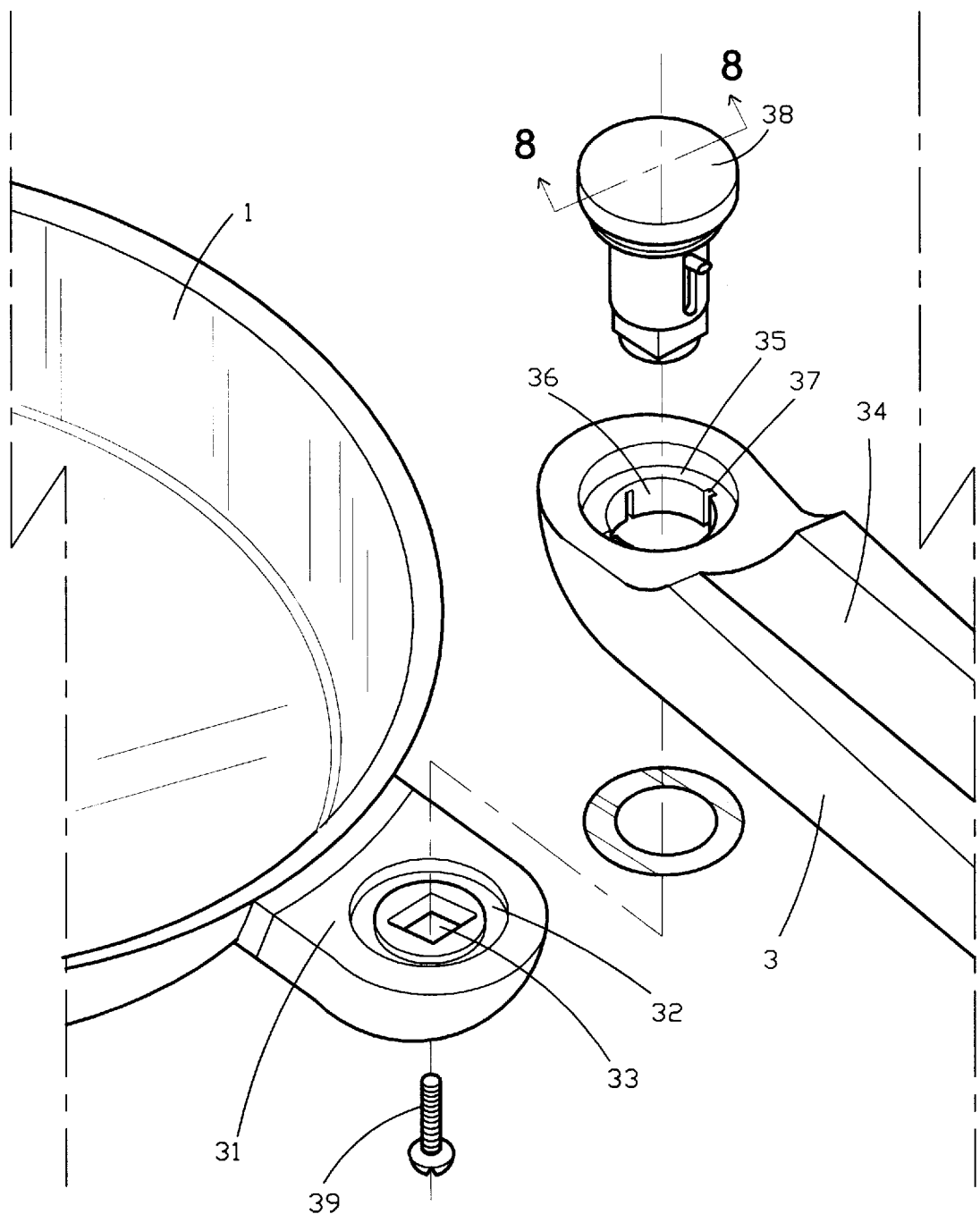
FIG. 7 is a perspective exploded view of the handle of the cooker assembly of the present invention.

Referring to FIGS. 5, 6, and 7, the handle 3 according to the present invention is provided with a pushbutton 38 whereby the handle 3 is turnable to allow the handle 3 to be closed near the pan body 1. A coupling portion 31 of the handle 3 fixed to the pan body 1 is provided with a recess 32 which is centrally provided with a square through slot 33. The handle 3 is further provided with a curved depression 34 on which the spoon or lifter 5 may be placed (see FIG. 5) when the pan body 1 is not covered. A front end of the handle 3 is provided with a recessed portion 35 which is centrally provided with a round through hole 36 with a surrounding wall provided with spaced apart slots 37. The pushbutton 38 is internally fitted with a spring 385 and a transverse support rod 389. A screw 39 is then used to screwably couple the handle 3 to its coupling portion 31 so that the handle 3 is turnable in position or to be closed near the pan body 1. It can therefore be appreciated that the present invention provides a completely new pot or pan structure.

Figure 8:
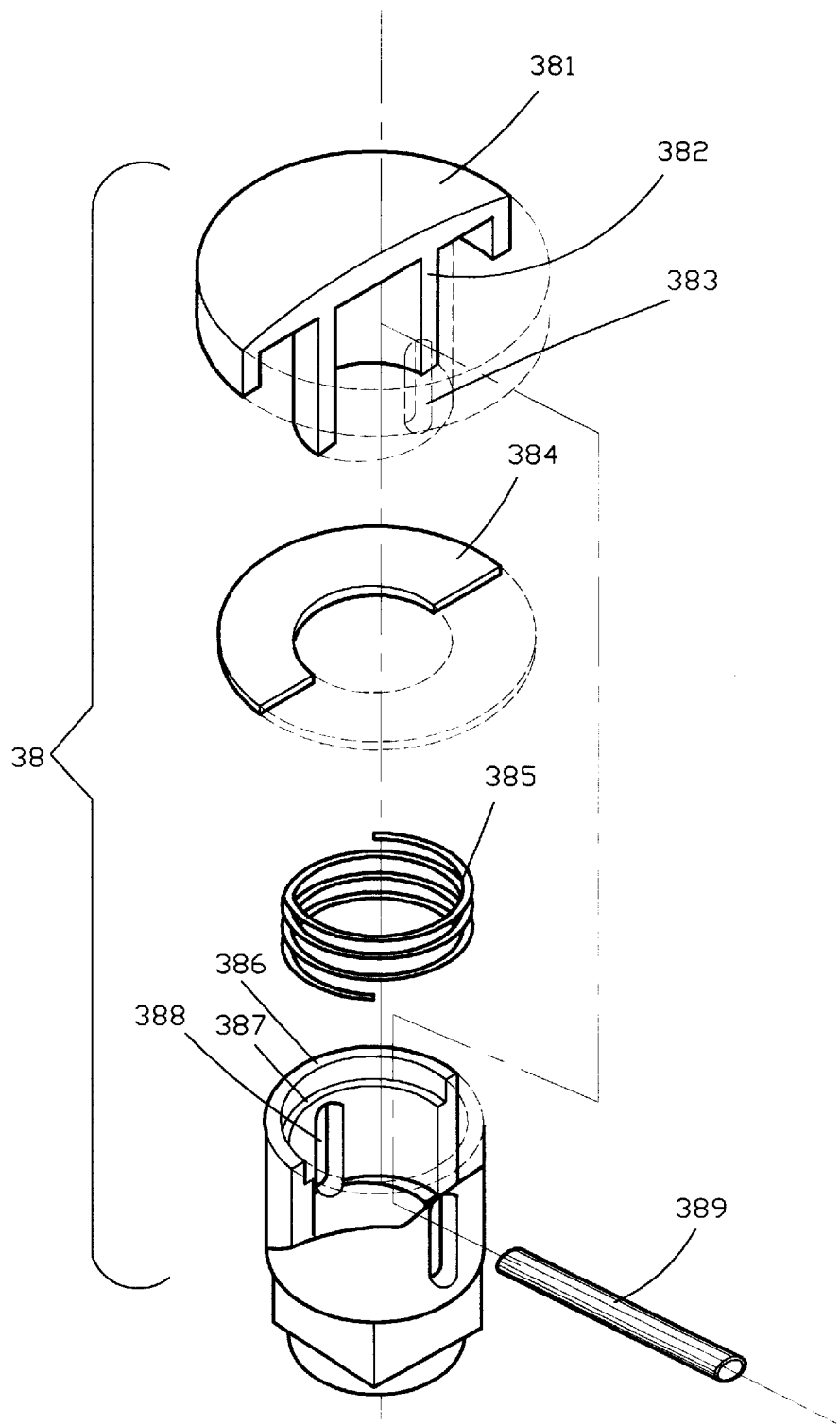
FIG. 8 is an exploded view of a pushbutton of the handle shown in FIG. 7 in part.

Referring to FIG. 8, the pushbutton 8 includes a push element 381, a hollow cylindrical post 381 below the push element 381. The cylindrical post 381 is provided with a longitudinal hole 383. A packing ring 381 is disposed below the push element 381 with a sleeve 386 located below. The surrounding wall of the sleeve 386 is provided with longitudinal slots 388. A raised rim 387 is further provided near the upper end of the sleeve projecting from the surrounding wall. The spring 385 is fitted over the cylindrical post 382 of the push element 381 with a lower end thereof abutting the raised rim 387 of the sleeve 386 for positioning purposes. The transverse support rod is passed through the longitudinal slots 388 and the longitudinal hole 383. The pushbutton 38 is then driven into the round through hole 36 of the handle 3 to couple with the handle 3. The screw 39 is then used to screwably connect the handle 3 to the coupling portion 31 fixed to the pan body 1.

Although the present invention has been illustrated and described with reference to the preferred embodiment thereof, it should be understood that it is in no way limited to the details of such embodiment but is capable of numerous modifications within the scope of the appended claims.

What is claimed is:

1. A cooker assembly comprising a cooker body, a handle, an auxiliary handle, and a cover, wherein said handle is rotatable to be closed near said cooker body and is adapted to allow a spoon or lifter thereon to be placed thereon when said cooker body is not covered by said cover; said auxiliary handle is adapted to receive one end of the spoon or lifter when said cooker body is not covered by said cover; and said cover has a knob adapted to allow the spoon or lifter to be placed thereon and is rotatable to allow control of escape of air from said cooker body, whereby said cooker assembly is convenient to use, and easy to store and transport.

2. A cooker assembly as defined in claim 1, wherein said knob of said cover is substantially oval and provided with a curved recess at an upper side thereof for placement of the spoon or lifter, said knob having a base coupled to said cover and provided with a hole corresponding to a hole preformed in said cover such that turning of said knob allows control of the opening or closing of said holes to control escape of air said cooker body.

3. A cooker assembly as defined in claim 1, wherein said auxiliary handle is provided with a through hole adapted to receive one end of the spoon or lifter when said cooker assembly is not covered by said cover.

4. A cooker assembly as defined in claim 1, wherein said handle is provided with a longitudinal curve depression on which the spoon or lifter may be placed when said cooker body is not covered by said cover; and said handle further includes a coupling portion fixed to said cooker body and provided with a recess which is centrally provided with a square through hole, and a recessed portion at a front end thereof, said recessed portion being centrally provided with a round through hole having a surrounding wall provided with spaced apart vertical slots, a pushbutton internally fitted with a spring and a transverse support rod being fitted into said round through hole of said recessed portion, and a screw being used to screwably lock said handle to said coupling portion, whereby said handle is rotatable relative to said cooker assembly.

* * * * *